Patented May 28, 1929.

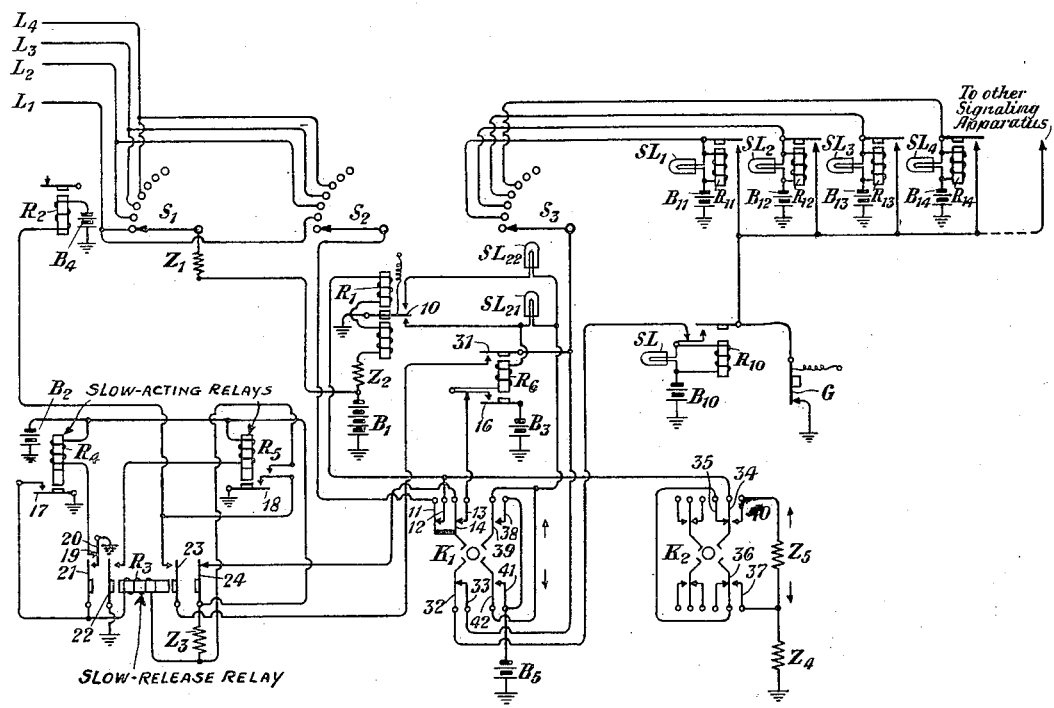

1,714,551

UNITED STATES PATENT OFFICE.

PAUL G. EDWARDS, OF BROOKLYN, NEW YORK, AND HAROLD W. HERRINGTON, OF MONTCLAIR, NEW JERSEY, ASSIGNORS TO AMERICAN TELEPHONE AND TELEGRAPH COMPANY, A CORPORATION OF NEW YORK.

CABLE-TESTING ARRANGEMENT.

Application filed September 13, 1927. Serial No 219,341.

This invention relates to systems for testing cables in order to detect the presence of low insulation or high leakage. More particularly, this invention relates to arrangements for continuously testing a plurality of conductors composing one or more cables in order to determine the presence of troubles due to low insulation, high leakage, or the like, preferably in the early stages of development.

In accordance with this invention, an arrangement is provided for continuously testing a plurality of conductors of one or more cables to determine whether a leak has developed, or whether the insulation resistance has decreased so as to render the system susceptible to failure for practical purposes. The particular testing system to be described does not paralyze the circuit arrangements connected to the conductors of the cable or cables so as to prevent their normal use in, for example, telephony, the testing system being merely supplemental to these circuit arrangements and introducing no substantial change in the electrical properties of the conductors. There is provided a sensitive detector or leak, such, for example, as a relay having an armature which may be moved from one contact to another as the current through the winding thereof changes by small increments. Obviously, a vacuum tube system of the detector type, or a system for measuring insulation resistance, or the like, may be substituted therefor without deviating from the principles of the invention. A feature of the invention includes an alarm, visual or audible, which may become operative when trouble in one or more of the conductors begins to develop. The alarm feature to be described will include a plurality of devices, one associated with each of the conductors, so that a particular conductor, or particular conductors, in which trouble is being developed may be promptly located.

Accordingly, it is one of the objects of this invention to provide a system for measuring the insulation property of a conductor by charging that conductor to a particular voltage and then continuously transmitting current over the conductor so as to be able to observe whether said current is greater than or less than a definite value.

It is another object of this invention to provide a system for detecting trouble due to low insulation, high leakage, or the like, in the conductors of one or more cables, the system involving means for measuring the resistance of the various conductors to determine the presence or absence of suitable properties of insulation, leakage, or the like, and indicating which of the conductors have sufficiently departed from the normal and suitable values and are thereby subjecting the system to possible failures in service.

Another object of the invention is to provide a testing system for testing insulation, leakage, or the like, in a plurality of conductors or other transmission channels by progressively charging the various conductors or transmission channels to substantially the same voltage, thereafter progressively determining the current magnitudes of the various conductors under continuous current conditions for a definite time interval, and indicating which of the conductors or transmission channels are unable to maintain currents of suitable amplitudes continuously during those intervals. It becomes necessary in such a system to obviate the difficulties caused by transients arising from inductive interference, or the like.

While this invention will be pointed out with particularity in the appended claims, the invention itself, both as to its further objects and features, will be better understood with the detailed description hereinafter following, when read in connection with the accompanying drawing showing one embodiment of the invention merely for the purpose of illustration.

The embodiment of the invention shown herein merely for illustrative purposes discloses a system for automatically switching testing apparatus from one conductor $L_1$ to another conductor $L_2$, then to another conductor $L_3$, and so on. Machine switching apparatus is provided, comprising a selector having three banks, one bank being employed for progressively connecting the various conductors to a battery $B_1$, or other source of definite voltage, so that the various conductors may be brought to the same initial conditions of voltage. Another of the selector banks is employed for subsequently connecting each of these conductors to a detector or relay, such as relay $R_1$ so that these electrical charges of these conductors may progressively cause a flow of current through the winding of the relay, these currents indicating whether the insulation properties, leakage properties, or the like, are satisfactory or not. The third selector bank may bring about the illumination of a plurality of signal lamps $SL_1$, $SL_2$, $SL_3$, $SL_4$, etc., one corresponding to each of the conductors $L_1$, $L_2$, $L_3$, $L_4$, etc., so that trouble may be visually indicated to the attendant. The reference character SL designates a signal lamp employed to provide a general alarm. The illumination of this signal lamp operates to signal the attendant that one or more of the lamps $SL_1$, $SL_2$, etc., corresponding to one or more of the various conductors, have operated, and advises the attendants to make the necessary repairs on the particular troubled conductors in order to prevent ultimate failure in service.

The three selector banks have selector arm $S_1$, $S_2$ and $S_3$ which are preferably located upon the same shaft so that they may revolve in synchronism. One end of the shaft has a notched wheel (not shown). Relay $R_2$ controls the rotation of the selector arms $S_1$, $S_2$ and $S_3$. A ratchet arm (not shown) is associated with the armature of relay $R_2$ and moves across the notched wheel when the winding of relay $R_2$ becomes energized, the notched wheel, however, not being rotated. When relay $R_2$ becomes deenergized, a spring attached thereto moves the armature back to its normal position, and the notched wheel is rotated in a clockwise direction, thereby advancing each of the selector arms one step. Since the selector arms are all located on the same shaft and are tied together, they revolve in synchronism.

As has already been stated, the selector arm $S_1$ revolves in a clock-wise direction to progressively connect each of the conductors $L_1$, $L_2$, $L_3$ and $L_4$, etc., to the battery $B_1$. Accordingly, each of the lines is charged by the battery $B_1$ to a definite voltage to ground, the charging circuit for conductor $L_1$, for example, including battery $B_1$, impedance $Z_1$, selector arm $S_1$, conductor $L_1$, and ground. Each of the conductors has a leak to ground of a definite amount. As the selector arms move to their respective second contact points, the conductor $L_2$ becomes charged, while conductor $L_1$ becomes connected to the testing circuit, which includes conductor $L_1$, selector arm $S_2$, contacts 11 and 12 of a key $K_1$, the winding of relay $R_1$, impedance $Z_2$, battery $B_1$, and ground. If sufficient current flows through conductor $L_1$ and through relay $R_1$, the armatures of relay $R_1$ will be moved downwardly and will cause relay $R_6$ to become operated, the circuit causing the operation of relay $R_6$ including the armature of relay $R_1$, the winding of relay $R_6$, contacts 13 and 14 of key $K_1$, armature 24 of relay $R_3$ and its contact, a battery $B_2$, and ground. Relay $R_6$ then becomes locked by the flow of current through its winding from a battery $B_3$, the locking circuit including battery $B_3$, armature 16 of relay $R_6$, the winding of relay $R_6$, armature 10 of relay $R_1$, and ground. It is to be observed that relay $R_6$ is of the make-before-break type, permitting the relay to be first operated by the flow of current through its winding from a battery $B_2$, and thereafter to become locked by a similar flow of current from another battery $B_3$.

Two dash-pot relays, which may preferably be substantially alike in their operating characteristics, are designated by the reference characters $R_4$ and $R_5$. It takes either of these relays a definite time interval to cause its armature to close the associated contact. Thus, fifteen seconds may be required to cause armature 17 or armature 18 to close its associated contact after a battery of suitable potentials has been connected to the winding of the relay. In this arrangement, one of these relays is brought into operation, its armature closing the associated contact after the predetermined time interval has elapsed, and thereafter that particular relay is deenergized and the other relay operated, a substantially similar time interval being required to cause the armature of the second relay to close its associated contact. The second relay then becomes deenergized, and the first relay again operates, and so on. The time feature of this invention prevents the alarm system from operating unless one of the conductors, such as $L_1$, has caused relay $R_1$ to become operated for a definite space of time. Thus, in this illustration, if relay $R_1$ has remained operated for more than fifteen seconds, then the alarm circuit may become operated.

The winding of relay $R_4$, also a dash-pot or slow-acting relay, may become energized by the flow of current from battery $B_2$ through its winding and through contact 19, contact 20, and ground. Due to the dash-pot action of this relay, a definite time limit, such as fifteen seconds, must elapse before armature 17 of that relay closes its associated contact. After this interval has elapsed, relay $R_3$, which may preferably be a slow-release relay, becomes operated, the circuit connected to the winding of relay $R_3$ including armature 17 and its contact, the winding of relay $R_3$, impedance $Z_3$, battery $B_2$, and ground. The armatures 21, 22, 23 and 24 are simultaneously attracted, armature 21 causing relay $R_3$ to become locked, the locking circuit including contact 20, armature 21, the winding of relay $R_3$, impedance $Z_3$, battery $B_2$, and ground. At the instant the relay $R_3$ operates, relay $R_4$ releases its armature due to the fact that the grounded connection provided by contacts 19 and 20 of relay $R_3$ is opened. At the same instant, the winding of relay $R_5$ becomes energized by the flow of current therethrough from battery $B_2$, the circuit including the armature 22 of relay $R_3$ and its contact, and ground. Due to the fact that relay $R_5$ is also of the dash-pot type, a similar time interval of, for example, fifteen seconds, is required to cause armature 18 to close its associated contacts. After this time interval has elapsed, relay $R_2$, which controls the action of the various selector arms, becomes operated, the circuit including battery $B_4$, the winding of relay $R_2$, armature 18 of relay $R_5$ and its contact, and ground. Shortly thereafter, armature 18 causes the winding of relay $R_3$ to become deenergized due to grounded connections at both terminals of said winding, this circuit including ground and armature 18 of relay $R_5$ and its contacts, the winding of relay $R_3$, armature 21 of relay $R_3$, contact 20 of that relay, and ground. At the same time, impedance $Z_3$ is serially connected to battery $B_2$ to prevent a short circuit, the circuit interconnecting battery $B_2$ and impedance $Z_3$ including armature 18 of relay $R_5$ and its associated contacts. Furthermore, the release of relay $R_3$ causes relay $R_5$ to be similarly released, the grounded circuit provided by armature 22 of relay $R_3$ being opened. Also, relay $R_2$ releases its armature because the series connection provided by armature 23 of relay $R_3$ becomes opened. Accordingly, the selector arms $S_1$, $S_2$ and $S_3$ are simultaneously rotated, advancing their connections one step. Thereafter, the winding of relay $R_4$ becomes energized, and so it continues.

An alarm feature is provided in this invention, comprising an indicating device SL as a general alarm element, and a plurality of indicating devices $SL_1$, $SL_2$, $SL_3$, $SL_4$, etc., as individual alarm elements, one corresponding to each of the conductors $L_1$, $L_2$, $L_3$, $L_4$, etc. When one of the conductors, which has been previously charged, subsequently becomes tested through the winding of relay $R_1$, and the continuous current is sufficient to move the armature 10 of relay $R_1$ downwardly, then relay $R_6$ will become operated. If relays $R'_1$ and $R_6$ are still operated when relay $R_5$ is also operated, then the indicating device corresponding to the conductor connected to relay $R_1$ will indicate the presence of trouble, the circuit operating indicating device $SL_1$ corresponding to conductor $L_1$, for example, including battery $B_{11}$, indicating device $SL_1$, selector arm $S_3$, armature 31 of relay $R_6$, armature 23 of relay $R_3$, armature 18 of relay $R_5$, and ground. If, however, relay $R_1$ is released during the time relay $R_3$ is operated, relay $R_6$ releases and cannot become locked up again. Consequently, the operation of relay $R_5$ does not bring in an alarm. A relay $R_{11}$, whose winding is in parallel relationship with the signal lamp $SL_1$, also becomes operated. Its armature is therefore attracted, locking the circuit of relay $R_{11}$ and providing a steady indication at indicating device $SL_1$, the circuit including battery $B_{11}$, winding of relay $R_{11}$ and the indicating device $SL_1$ in parallel relationship therewith, the armature of relay $R'_{11}$, general release key G, and ground. A general indicating device SL and a corresponding relay $R_{10}$ are also included in parallel relationship in a circuit which is similarly operated by virtue of the fact that this circuit is connected in parallel relationship with the circuit including the individual indicating device $SL_1$ and a corresponding relay $R_{11}$. The general indicating device SL and relay $R_{10}$ are energized by the flow of current from battery $B_{10}$ through the circuit including contacts 32 and 33 of key $K_1$, the armature 31 of relay $R_6$, armature 23 of relay $R_3$, armature 18 of relay $R_5$, and ground. As the winding of relay $R_{10}$ becomes energized, its armature is attracted, locking its circuit and providing a steady indication at the indicating device SL, the circuit including battery $B_{10}$, the armature of relay $R_{10}$, general release key G, and ground.

It is to be observed that as any one of the individual signal lamps $SL_1$, $SL_2$, $SL_3$, $SL_4$, etc., corresponding to one of the conductors $L_1$, $L_2$, $L_3$, $L_4$, etc., become operated, the general signal lamp SL also becomes operated. The general signal lamp SL indicates to the attendant that one of the individual signal lamps has operated, and he may, accordingly, determine which of the conductors may be troublesome upon inspection of the individual signal lamps. After an inspection has been made, the attendant may release the general release key G, whereupon relay $R'_{10}$, as well as signal lamp SL, will become deenergized, and one or more of the individual signal lamps $SL_1$, $SL_2$, $SL_3$, $SL_4$, etc., and the corresponding relays, previously operated, similarly become deenergized.

The operation of relay $R_1$ may be tested for leakage and insulation by operation of keys $K_1$ and $K_2$. By throwing key $K_1$ upwardly, and key $K_2$ downwardly, impedance $Z_4$ will be connected to the winding of relay $R_1$. Accordingly, current will flow from battery $B_1$ through impedance $Z_2$, the winding of relay $R_1$, contacts 34, 35, 36 and 37 of key $K_2$, impedance $Z_4$, and ground.

The various conductors $L_1$ and $L_2$, etc., are disconnected from relay $R_1$ by virtue of the fact that the circuit including contacts 11 and 12 of relay $K_1$ is opened. If current flows through the winding of relay $R_1$ to suitably energize its winding, signal lamp $SL_{21}$ will become illuminated, the circuit including battery $B_5$, contacts 38 and 39 of key $K_1$, signal lamp $SL_{21}$, armature 10 of relay $R_1$ and ground. Similarly, if insufficient current flows through the winding of relay $R_1$, current will flow from battery $B_5$ through the signal lamp $SL_{22}$ in a similar circuit, thereby illuminating signal lamp $SL_{22}$.

The operation of relay $R_1$ may be tested for even greater impedance in circuit with its winding by maintaining key $K_1$ in its upward position and throwing key $K_2$ upwardly. Accordingly, impedances $Z_4$ and $Z_5$ are connected in series relationship with the winding of relay $R_1$, the series circuit including impedance $Z_4$, impedance $Z_5$, contact 40 and 34 of key $K_2$, the winding of relay $R_1$, impedance $Z_2$, battery $B_1$, and ground.

Again, if current flows through the winding of relay $R_1$ sufficient to operate its armature, signal lamy $SL_{21}$ will become illuminated, and if insufficient current flows therethrough, signal lamp $SL_{22}$ will become illuminated.

The individual conductors may be tested for various leak resistances by manipulation of keys $K_1$ and $K_2$. By throwing key $K_1$ downwardly, and key $K_2$ also downwardly, impedance $Z_4$ will be connected in shunt with one of the conductors, the circuit including impedance $Z_4$, contacts 37 and 36 of key $K_2$, contacts 35 and 34 of key $K_2$, the winding of relay $R_1$, impedance $Z_2$, battery $B_1$, and ground. Since the circuit including contacts 11 and 12 of key $K_1$ remains closed, impedance $Z_4$ will bridge the particular conductor connected therethrough to the winding of relay $R_1$. Of course, that particular conductor is connected to the winding of relay $R_1$ through selector arm $S_2$. If the shunting of the individual conductor by impedance $Z_4$ is sufficient to cause the operation of relay $R_1$, signal lamp $SL_{21}$ will become illuminated by the flow of current therethrough from battery $B_5$, as described hereinbefore. If not, signal lamp $SL_{22}$ will become illuminated. To test a particiluar conductor for a greater leak resistance, key $K_2$ may be thrown upwardly. Then impedances $Z_4$ and $Z_5$ will be connected to the winding of relay $R_1$ in shunt with that particular conductor. Either signal lamp $SL_{21}$ or signal lamp $SL_{22}$ will become operated in accordance with the state of energization of relay $R_1$. When key $K_1$ is thrown downwardly to test a particular conductor for resistance in shunt therewith, the alarm circuits, which have contacts 32 and 33 as elements, are opened. Thus, the alarm feature of this invention is disconnected.

While the alarm feature of this invention has been shown herein as embodying visible indicating devices merely for the purpose of illustration, it will be clearly understood that other types of alarms or automatic measuring equipments, or the like, may be employed instead thereof, within the scope of the invention.

While this invention has been shown and described in one particular embodiment merely for the purpose of illustration, it will be understood that the general principles of this invention may be applied to other and widely varied organizations, without departing from the spirit of the invention or the scope of the appended claims.

What is claimed is:

1. The method of determining the insulation properties of a conductor, which consists in charging the conductor to a definite voltage, transmitting current through the conductor at a rate which diminishes until it reaches a predetermined value, and determining whether the current flowing through the conductor is greater than or less than said predetermined value.

2. The method of determining the insulation properties of a plurality of conductors, which consists in successively charging each of said conductors to a definite voltage, successively transmitting current continuously through each of said conductors in order to learn whether the continuous current through each conductor is greater than or less than a definite value, and indicating which conductors transmit currents less than the definite value.

3. The method of detecting trouble in the conductors of cables due to low insulation or high leakage, which consists in progressively measuring the resistance of the conductors of the cables upon the application of continuous currents to determine whether the insulation and leakage properties are satisfactory, and visually indicating departures of the insulation and leakage values from their normal values.

4. The method of detecting trouble in a plurality of transmission channels due to low insulation and high leakage, which consists in progressively charging the various transmission channels to substantially equal voltages, progressively determining the continuous current magnitudes of the various conductors when connected to an impedance element of definite magnitude, and indicating which channels of transmission are enabled to maintain suitable continuous currents for time intervals of a predetermined minimum duration.

5. The method of detecting trouble in a plurality of conductors due to low insulation, which consists in progressively charging the various conductors to substantially the same voltage, progressively transmitting current through each of the various conductors for a substantial time interval, and indicating which conductors are enabled to maintain a current of a predetermined magnitude continuously throughout said time interval.

6. A testing system comprising a plurality of telephone conductors, a plurality of indicating devices one corresponding to each telephone conductor, means for charging each telephone conductor to a definite voltage, and means whereby current may be transmitted over each of said telephone conductors continuously in order that it may be possible to determine whether the continuous current is greater than a predetermined value, each indicating device becoming operated when the continuous current flowing over the corresponding conductor exceeds the predetermined value.

7. A testing system comprising a plurality of telephone conductors, a plurality of indicating devices, a selector having three selector arms revolving in synchronism, a battery whose voltage may be applied to said telephone conductors in progression through one of the selector arms, a detecting device to which said telephone conductors may be connected in progression through another of the selector arms in order that current may flow therethrough, each indicating device being associated with the third selector arm and becoming operated if the current from the corresponding telephone conductor exceeds a predetermined value.

8. A testing system for testing a plurality of telephone conductors for insulation properties, leakage and the like, comprising a selector having three selector arms revolving in synchronism, a battery whose voltage may be applied in progression to said conductors through one of the selector arms, a detecting device to which said conductors may be connected in progression through another of the selector arms in order that current may flow through said detecting device continuously through a definite time interval, and a plurality of indicating devices one corresponding to each conductor, each indicating device being controlled by the third selector arm and becoming operated when the continuous current through said detecting device is outside a range of predetermined values.

9. A testing system comprising a plurality of telephone conductors, a plurality of indicating devices one corresponding to each telephone conductor, means for charging each telephone conductor to a definite voltage, means for transmitting current over each telephone conductor and through a device having a definite impedance, each indicating device becoming operated when the current flowing over the corresponding telephone conductor is greater than a predetermined value for a minimum time interval.

10. The combination of a plurality of conductors, a plurality of indicating devices one corresponding to each conductor, means for charging each conductor to a definite electrostatic capacity, a detecting device through which said conductors may transmit current, time control apparatus comprising a pair of relays which become alternately operated for a definite time interval, each indicating device becoming operated when the corresponding conductor transmits current greater than a predetermined value throughout a period of time greater than the definite time interval of said time control apparatus.

11. A testing system for a plurality of telephone conductors, comprising means for charging each of the conductors to a definite electrostatic capacity, a detecting device, means for transmitting current through said detecting device over the various telephone conductors, a plurality of indicating devices one corresponding to each telephone conductor, each indicating device becoming operated when the corresponding telephone conductor transmits current greater than a definite value as a result of its low insulation resistance or high leakage or the like, and a general indicating device to indicate the operation of one or more of said individual indicating devices corresponding to the various telephone conductors.

In testimony whereof we have signed our names to this specification this 12th day of September, 1927.

PAUL G. EDWARDS.
HAROLD W. HERRINGTON.